July 31, 1923.

J. L. TAYLOR

CLAMP

Filed April 1, 1918

INVENTOR,
James L. Taylor,
BY
Russell M. Everett,
ATTORNEY.

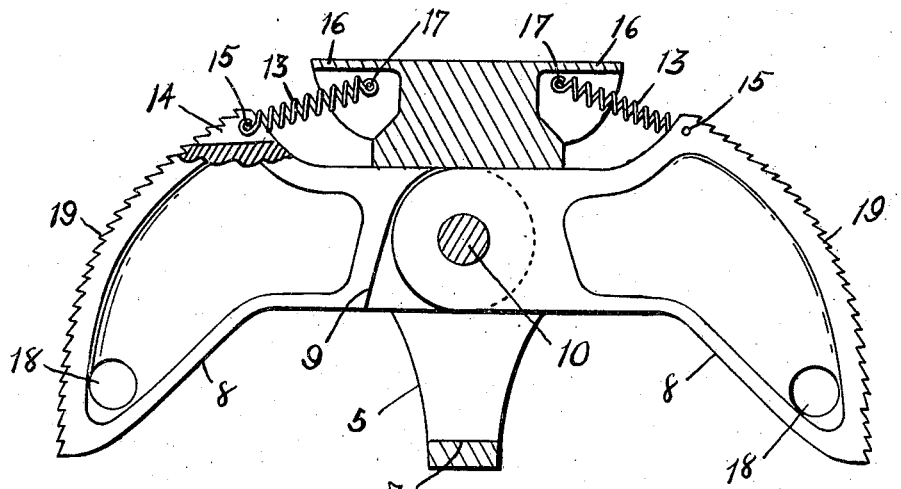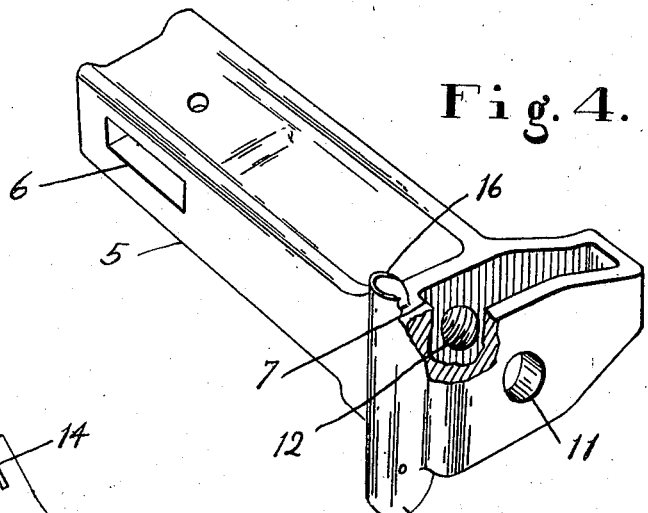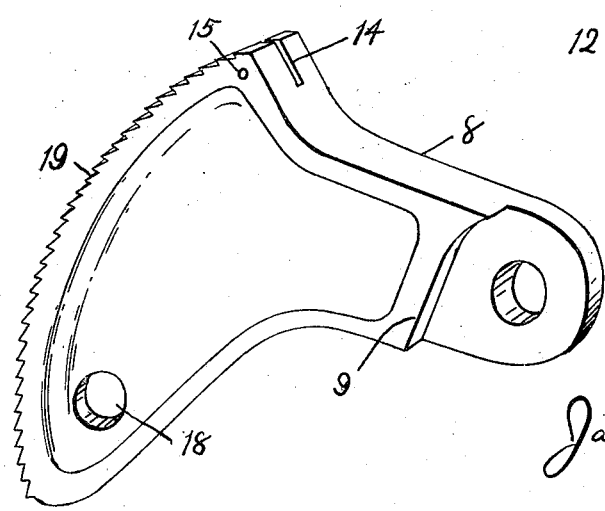

Patented July 31, 1923.

1,463,564

UNITED STATES PATENT OFFICE.

JAMES L. TAYLOR, OF POUGHKEEPSIE, NEW YORK, ASSIGNOR TO JAMES L. TAYLOR MANUFACTURING CO., OF NEW YORK, N. Y., A CORPORATION OF NEW YORK.

CLAMP.

Application filed April 1, 1918. Serial No. 226,016.

*To all whom it may concern:*

Be it known that I, JAMES L. TAYLOR, a citizen of the United States, and a resident of Poughkeepsie, in the county of Dutchess and State of New York, have invented new and useful Improvements in Clamps, of which the following is a specification.

This invention relates more especially to ship planking clamps, such as are used in bending the steamed planks against the outside of the ribs of a vessel and holding them in proper position there while being secured permanently in place, though it will be understood that my invention can be used for any purpose to which it is adaptable.

The objects of the invention are to provide means at one end of a member, such as the bar of a bar clamp, for temporarily anchoring or securing the same between adjoining ribs of a vessel or the like, where it is impossible for the clamp to project through between said ribs or the like and secure a bearing upon the other side thereof; to secure a firm, solid anchorage or holding of the end of the clamp between said ribs or the like, so that the planks can be readily bent against the ribs even though considerable force is needed; to secure a positive engagement with the ribs, which will not yield or slip; to enable such an engagement and anchorage to be secured notwithstanding variations in the distances between the ribs, within limits; to secure proper action of the clamps throughout a wide range of such variations; to provide means for automatically throwing the arms into engagement with the ribs under all conditions, and to enable the clamp to be put in position by simply thrusting its said arms between the ribs; to provide means for readily releasing the arms and for temporarily holding them in released position; to locate the arms at an angle to each other and to the bar of the clamp, so that they are readily engaged with the ribs by movement of the bar longitudinally in one direction, while movement of the bar in the other direction tends to disengage them; to restrict the range of movement of the arms to their limits of proper engagement with ribs; to secure a simple compact construction, which can be easily operated and has no parts to get out of place or become lost, and to obtain other advantages and results as may be brought out in the following description.

Referring to the accompanying drawings, in which like numerals of reference indicate the same parts throughout the several views, Figure 1 is a top view showing my improved clamp in use;

Figure 3 is a section through the fixed head taken close to the anchor arms, the latter being partly in section to show the springs which normally draw them open to grip;

Figure 4 is a perspective view of the fixed head, and

Figure 5 is a perspective view of one of the anchor arms.

Figure 2:
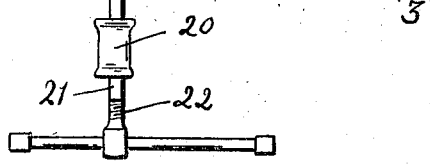
Figure 2 is a perspective view of the clamp.
Figure 2:
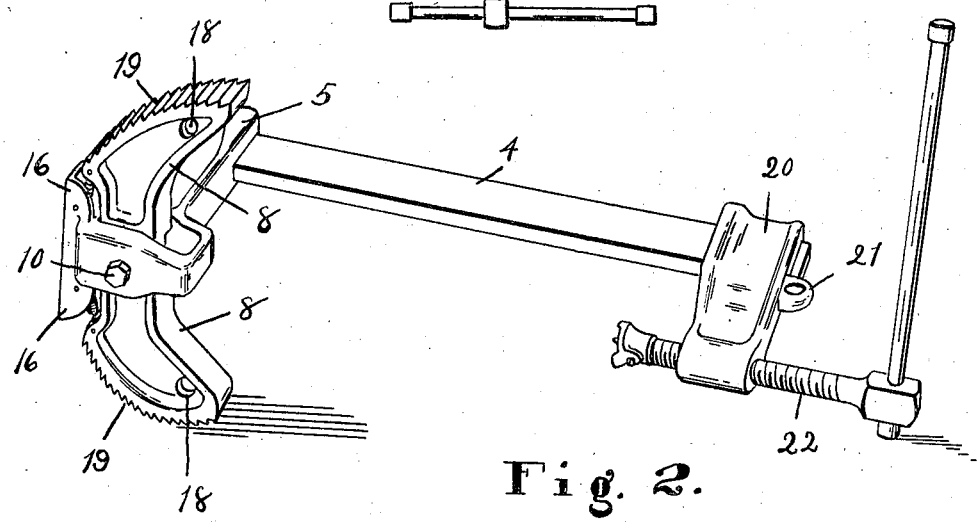

In said drawings, 1, 1 indicate ribs of a ship to which ceiling 2 is applied on the inside and planking 3 on the outside. Said ceiling is applied first, and it is necessary to find some means of anchoring a clamp between the ribs 1, 1 to draw the outside planking into place and hold it while being fastened there. My improved clamp is illustrated in use for that purpose, and in the specific embodiment of the invention shown in the drawings, 4 indicates a bar such as is commonly used for bar clamps and which may be of any desired length or size. At one end of this bar is a fixed head 5 which comprises a casting (see Figure 4) apertured edgewise and transversely at one end, as at 6, to receive the bar and at the other end apertured flatwise and transversely, as at 7, to receive the anchor arms 8, 8, which project laterally and oppositely from the clamp when held with the bar edgewise. These arms 8, 8 are of a thickness to movably fill the aperture 7 and their inner ends are oppositely recessed, as at 9, to overlap after the manner of a half-joint and receive a pivotal bolt or screw 10 which passes loose through a hole 11 in the end wall of the head 5 and screws into the body of the head, as at 12 in Figure 4. The wall of the aperture 7 at the edge of the head opposite that from which the bar 4 projects forms a stop for the arms 8, 8, when the clamp is not in use, see Figures 2 and 3, but the other edge wall is narrowed as shown to permit the arms to swing toward each other in that direction. When the clamp is not in use, the arms are held against said stop, as shown in Figure 3, by tension springs 13, 13, one for each arm and secured at one end to the arm and at its other end to the head 5. I have shown said springs secured to the arms in saw slits 14 by transverse pins 15, and secured to the head under hoods 16 by crosspins 17, but any suitable way may be employed. The hoods 16, shown, serve to cover and protect the springs to a considerable extent, however. For swinging the arms toward each other, against the pulls of said springs, in order to disengage the clamp or remove it to a new position, finger holes 18, 18 are preferably provided, one in the extremity of each arm.

Figure 1:
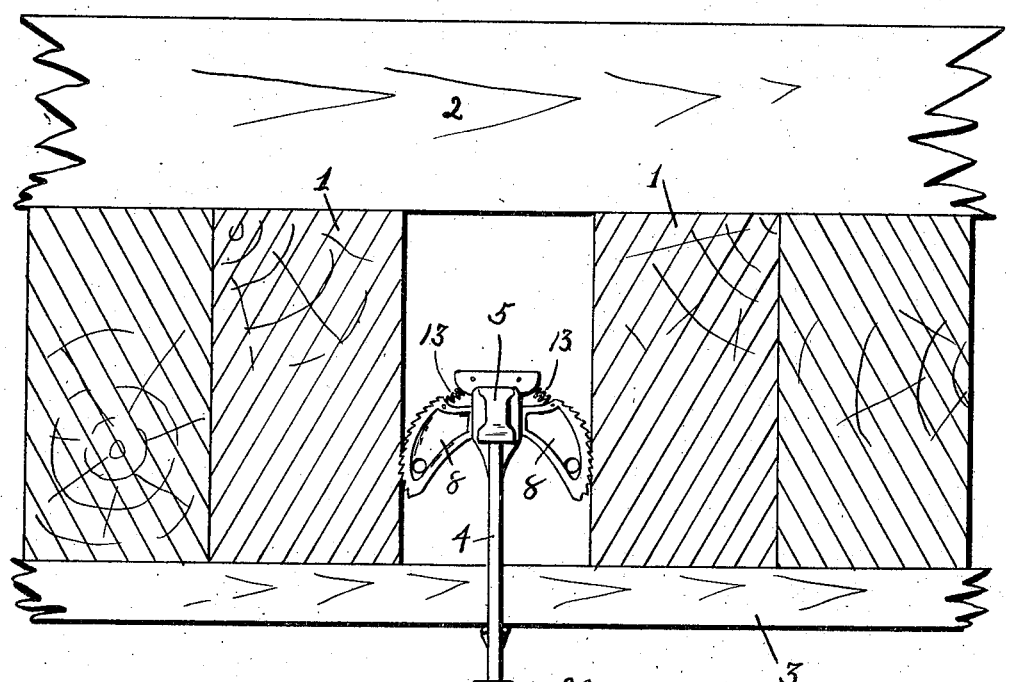

The said arms 8, 8 are widened at their outer ends, in the plane in which they swing, which plane is parallel to the edge of the bar 4 and spaced therefrom by the length of the head 5, and the end edges 19 of said arms are curved eccentrically and adapted to grip a surface, as by being toothed. The curvature is such that when the arms are swung toward each other as far as possible, the rear ends of the gripping edges 19, 19, or ends away from the edge of the head 5 from which the bar 4 projects, are farther apart than any other portions of said gripping edges, and thus when the arms are released after the clamp has been inserted between two ship ribs or the like their gripping ends will engage said ribs, as shown in Figure 1, and hold with minimum yielding or movement of the head 5 under draft or pull upon the clamp bar. Also the eccentric curvature, with the swinging arms, enables the clamp to effectually grip ribs or the like even though the distances between them vary considerably, and it is a feature of my construction to secure a very wide range of variation.

The bar 4 carries a second head 20, which is preferably adjustable for quick positioning close to the work, as for example by the wedge 21 of my prior Patent No. 867,622 issued October 8, 1907, said head 20 projecting from the bar 4 similar to the fixed head 5 and being provided with a clamping screw 22 to engage the planking 3 or other work, as is usual in bar clamps.

In using my improved clamp it is necessary only to insert the anchor end between the ribs or the like, simply pushing it in, when the springs 13 automatically throw the arms into engagement with the ribs, which engagement is equally good and strong notwithstanding variations in distances between the ribs and only increases with draft upon the clamp bar as the screw 22 is turned into engagement with the planking. To release the clamp from between the ribs or the like, it is necessary only to push it slightly inward to loosen the gripping ends of the arms and then swing them toward each other out of engagement with the ribs, by the finger holes 18, 18. A most quick and efficient operation is thus secured by my improved construction and the progress of work in which the clamp is being used is greatly expedited.

Obviously detail modifications and changes may be made in manufacturing my improved clamp, without departing from the spirit and scope of the invention, and I do not wish to be understood as restricting myself except as required by the following claims when construed in the light of the prior art.

Having thus described the invention, what I claim is,

1. In a clamp of the character described, the combination of a bar having a laterally projecting head apertured transversely of the plane of said bar and head, and an arm pivoted in the aperture of said head and having its swinging limited thereby to positions in which said arm is always operative to engage with a cam action the side wall of a space into which the clamp is thrust and anchor the clamp.

2. In a clamp of the character described, the combination of a bar having a laterally projecting head apertured transversely of the plane of said bar and head, and an arm pivoted in the aperture of said head and having its swinging limited by one wall thereof to positions in which said arm is always operative to engage with a cam action the side wall of a space into which the clamp is thrust and anchor the clamp.

3. In a clamp of the character described, the combination of a bar having a laterally projecting head apertured transversely of the plane of said bar and head, an arm pivoted in the aperture of said head and having its swinging limited by one wall thereof to positions in which said arm is always operative to engage with a cam action the side wall of a space into which the clamp is thrust and anchor the clamp, and a spring normally holding said arm against said wall.

4. In a clamp of the character described, the combination of a bar, a head projecting from said bar, an arm fulcrumed on said head to swing transversely thereof and longitudinally of the bar and engage with a cam action the side wall of a space into which the clamp is thrust, a hood on said head, and a spring in said hood connected to said arm to yieldingly hold the same in extended position.

5. In a clamp of the character described, the combination of a bar, a head projecting from said bar, an arm fulcrumed on said head to swing transversely thereof and longitudinally of the bar and engage with a cam action the side wall of a space into which the clamp is thrust, a hood and a stop on said head, and a spring in said hood holding the arm against said stop.

6. In a clamp of the character described, the combination of a bar, a head projecting from said bar, an arm fulcrumed on said head to swing transversely thereof and longitudinally of the bar and engage with a cam action the side wall of a space into which the clamp is thrust, a hood on said head at the side thereof away from the work, and a spring extending from the arm to the head beneath its said hood.

7. In a clamp, the combination of a bar, a head projecting from the working edge of said bar and having an aperture transverse to the plane of the bar, an arm pivoted in said opening and adapted to swing against one wall thereof as a stop, a spring normally holding said arm against said stop, and a hood projecting from said stop over said spring.

8. In a clamp, the combination of a bar, a head projecting from the working edge of said bar and having an aperture transverse to the plane of the bar, an arm pivoted in said opening and adapted to swing against one wall thereof as a stop, a spring normally holding said arm against said stop, and a hood projecting from said stop over said spring, said arm having a finger hole through its outer end at the side away from said stop.

JAMES L. TAYLOR.